Oct. 6, 1931.　　　A. SONNEFELD　　　1,825,828
PHOTOGRAPHIC LENS
Filed Aug. 30, 1930
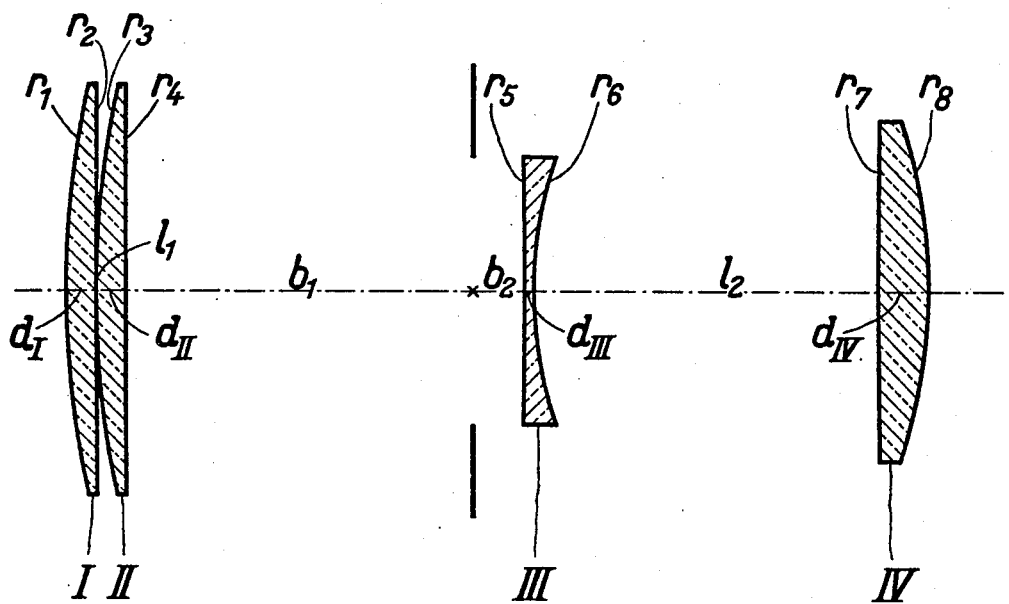
Inventor:
August Sonnefeld.

Patented Oct. 6, 1931

1,825,828

UNITED STATES PATENT OFFICE

AUGUST SONNEFELD, OF JENA, GERMANY, ASSIGNOR TO THE FIRM OF CARL ZEISS, OF JENA, GERMANY

PHOTOGRAPHIC LENS

Application filed August 30, 1930, Serial No. 479,017, and in Germany September 10, 1929.

The present invention refers to spherically, comatically, chromatically, and astigmatically corrected lens systems similar to the so-called Cooke lens, viz. to a triplet, in which a dispersive part is placed at comparatively great air spaces between two converging parts. The invention provides a great advantage in the manufacture of these objectives by providing in front of the said three parts a fourth, converging, part, by making all converging lenses of crown glass whose refractive index is inferior to 1.52 and, finally, by giving the photographic lens a total vertex length which is greater than one third of the focal length. Hitherto at least one part of these lenses was made of highly refractive glasses and it was generally assumed that only by means of glass of this kind could the necessary correction be attained. However, in the case of systems of great focal length such as are required for astronomical purposes it very often takes several years to obtain of such highly refractive crown glasses discs that correspond to the lenses which, owing to the great focal lengths, frequently have to be made of considerable diameters. Manufacturing crown glasses of low refractive indices is far more easy and it turned out that, contrary to what was believed hitherto, a correction equally as efficient as that obtained hitherto can be arrived at also with crown glasses of low refraction. It even proved that also in case of an aperture ratio of 1:5 the new objectives allow of obtaining so slight a distortion as hitherto was possible only in case of small apertures (of approximately 1:15). If borosilicate glasses whose $\nu$-value is greater than 63 are used for the collective lenses and a flint glass whose $\nu$-value is smaller than 37.5 is taken for the dispersive lens, the chromatic difference of the spherical aberration can be completely eliminated for a range of wavelength from 0.350 $\mu$ to 0.500 $\mu$.

The accompanying drawing as well as the table below give an example of a system which is made in accordance with the invention and has a focal length of 2000 mm. and an aperture of 400 mm.

| Radii | Thicknesses and distances |
|---|---|
| $r_1 = +897.0$ mm. | $d_I = 30$ mm. |
| $r_2 = +3636.0$ mm. | $l_1 = 0$ mm. |
| $r_3 = +897.0$ mm. | $d_{II} = 30$ mm. |
| $r_4 = +3636.0$ mm. | $b_1 = 342$ mm. |
| $r_5 = -980.0$ mm. | $b_2 = 50$ mm. |
| $r_6 = +389.0$ mm. | $d_{III} = 8$ mm. |
| $r_7 = +2254.0$ mm. | $l_2 = 338$ mm. |
| $r_8 = -501.0$ mm. | $d_{IV} = 50$ mm. |

KINDS OF GLASS

| | I | II | III | IV |
|---|---|---|---|---|
| $n_d=$ | 1.5163 | 1.5163 | 1.6129 | 1.5163 |
| $\nu=$ | 64.0 | 64.0 | 37.0 | 64.0 |

I claim:
1. A photographic lens consisting of four parts, viz. a dispersive part enclosed at comparatively great air spaces between two converging parts and a further, converging, part placed in front of the said three parts, all converging lenses being of crown glass of a refractive index inferior to 1.52, and the distance between the front lens vertex and the rear lens vertex being greater than one third of the focal length.

2. A photographic lens consisting of four parts, viz. a dispersive part enclosed at comparatively great air spaces between two converging parts and a further, converging, part placed in front of the said three parts, all converging lenses being of crown glass of borosilicate whose refractive index is smaller than 1.52 and whose $\nu$-value is greater than 63, the dispersive lens being of flint glass whose $\nu$-value is smaller than 37.5, and the distance between the front lens vertex and the rear lens vertex being greater than one third of the focal length.

AUGUST SONNEFELD.